United States Patent [19]

Hernden

[11] Patent Number: 4,696,121

[45] Date of Patent: Sep. 29, 1987

[54] FISHING LURE BREAKAWAY CLIP

[76] Inventor: Bradley W. Hernden, 20488 Poinciana, Redford, Mich. 48240

[21] Appl. No.: 848,311

[22] Filed: Apr. 4, 1986

Related U.S. Application Data

[63] Continuation-in-part of Ser. No. 589,228, Mar. 14, 1984, abandoned.

[51] Int. Cl.⁴ ............................................. A01K 91/04
[52] U.S. Cl. ...................................... 48/17.2; 43/43.1
[58] Field of Search ................... 43/17.2, 43.1, 43.12; 24/115 F, 115 R, 236, 237, 230.5 AD, 602, 599, 204

[56] References Cited

U.S. PATENT DOCUMENTS

| | | | |
|---|---|---|---|
| 794,695 | 7/1905 | Bagnall | 24/237 |
| 1,497,710 | 6/1924 | Cole | 24/237 |
| 1,974,381 | 9/1934 | Swanson et al. | |
| 2,359,588 | 10/1944 | Shea | |
| 2,733,537 | 2/1956 | Elsberg | 43/43.12 |
| 2,756,478 | 7/1956 | Morrissey | 24/237 |
| 2,768,468 | 10/1956 | Kibler et al. | 43/43.12 |
| 2,775,057 | 12/1956 | Ludgate | |
| 2,839,803 | 6/1958 | Wiselka | 24/237 |
| 3,077,694 | 2/1963 | Cox | |
| 3,091,885 | 6/1963 | Ulsh | 43/43.12 |
| 3,218,751 | 11/1965 | Walker | |
| 3,518,784 | 7/1970 | Kling et al. | |
| 3,541,720 | 11/1970 | Buffet | 43/43.12 |
| 3,648,399 | 3/1972 | Lloyd | |
| 4,125,958 | 11/1978 | Cote | |
| 4,370,783 | 2/1983 | Fretwell | 24/115 F |

Primary Examiner—M. Jordan
Attorney, Agent, or Firm—Harness, Dickey & Pierce

[57] ABSTRACT

A breakaway clip is disclosed which fails at a predetermined tension level, and when interposed between a fishing lure and hook, may be used to allow the lure to be pulled from the hook in the event of hook snagging. The failure level of the clip is chosen to occur at a slightly lower tension level than that of the associated fishing line. In use, the coupling that is supplied with a lure is first removed and the breakaway clip installed in its place.

10 Claims, 7 Drawing Figures

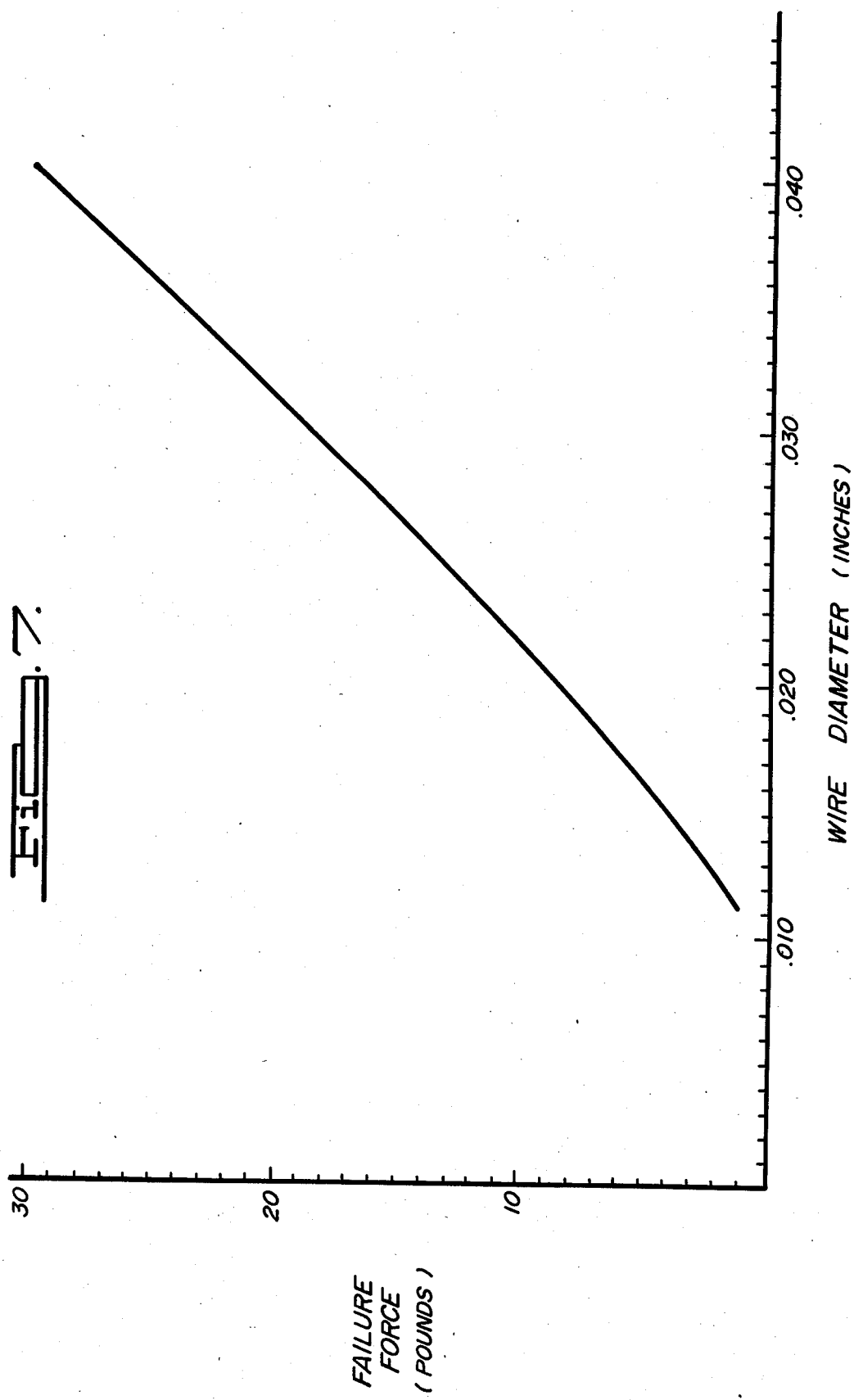

4,696,121

FISHING LURE BREAKAWAY CLIP

CROSS REFERENCE TO RELATED APPLICATIONS

This application is a continuation-in-part of copending patent application Ser. No. 589,228, filed Mar. 14, 1984, now abandoned.

BACKGROUND AND SUMMARY OF THE INVENTION

This invention relates to an apparatus for sport fishing and particularly, to a breakaway clip adapted to be installed between a fishing lure and an associated hook which prevents loss of the lure when the hook becomes snagged.

Sport fishermen have long been plagued with the frequent occurrence of losing fishing lures when the hook becomes entangled with underwater objects. Normally, when such entanglement occurs, the fisherman cuts the fishing line or tries to pull it free until the fishing line fails resulting in a loss of the lure. The potential for such loss necessitates that the angler must bring a number of lures with him during a fishing outing. Moreover, loss of lures translates into a loss of a considerable sum of money over the course of a fishing season.

Numerous approaches toward avoiding the loss of lures due to hook snagging have been previously proposed. These devices generally attempted to provide a means for releasing the fishing lure from the hook and are attached to the hook and lure and release once a predetermined level of tension force is applied. This level of force is chosen somewhat less than the breaking tensile strength of the fishing line being used, thereby permitting the lure to be recovered while losing only a relatively inexpensive fishing hook. In one such device described by U.S. Pat. No. 4,125,958, issued to Cote, a ball-and-socket arrangement is used for such a releasable coupling. This device is, however, relatively complex and expensive to manufacture. It is also believed that this device would not provide repeatable and accurate release levels. In U.S. Pat. No. 3,541,720, issued to Buffet, a circular ring is employed to provide a releasable coupling between lure and hook. This device, however, requires specially manufactured hooks and lures in that these associated components must be configured such that the ring can be installed. Without using a specially designed hook and lure, the Buffet coupling may be installed therebetween using lengths of fishing line attaching the components. This approach, however, would be time consuming and difficult to accomplish. U.S. Pat. No. 1,768,468 issued to Fibler discloses yet another releasable coupling which employs a roughly figure eight shaped component having one releasing split portion. This invention includes the drawbacks of the previously mentioned Buffet reference in that specially manufactured hooks or lures are needed for a hook-to-lure attachment or the unit must be otherwise connected to them by a separate length of line. The Kibler structure is also complex and relatively expensive to manufacture. According to U.S. Pat. No. 1,974,381, issued to Swanson, a releasable coupling is provided for a sinker which is dragged along the water bottom during fishing. This releasable coupling is made from formed wire. This device, however, would not provide an accurate and repeatable release level since the free end of the wire must be deformed significantly in order to install the sinker and redeformed to its original position. Such deformation changes the shape of the wire coupling and hence its release level. A number of other prior art patents teach complicated mechanical release systems which generally employ a coil spring to sense the level of tension exerted on the hook. These devices are, however, considerably costly and therefore not suitable for everyday use by fishermen.

In view of the above, it is a principal object of this invention to provide a breakaway coupling between a fishing lure and hook which fails at a predetermined load level enabling the lure to be pulled from the hook in the event that the hook becomes snagged. It is a further object to provide such a breakaway coupling which is very inexpensive to manufacture and use. It is a further object of this invention to provide a simple tool apparatus which may be used to manufacture a breakaway coupling.

The principal objects of this invention are provided by a breakaway clip made from a piece of wire which is formed to have a generally straight center section with a pair of loops extending from the center section which are formed to have end portions which touch or nearly touch the center section. The loop portions terminate in curled ends which facilitate attachment of the clip to the associated tackle components. The clip may be inserted between the fishing lure and associated hook and can be installed on existing fishing lures and hooks. The clip according to this invention enables easily adjusted release tension levels by changing the wire diameter of the stock from which the clip is made.

Additional benefits and advantages of the present invention will become apparent to those skilled in the art to which this invention relates from the subsequent description of the preferred embodiments and the appended claims, taken in conjunction with the accompanying drawings.

BRIEF DESCRIPTION OF THE DRAWINGS

FIG. 7 is a graph showing a representative failure force versus wire diameter relationship for breakaway clips constructed in accordance with this invention made from a particular stainless steel wire material.

DETAILED DESCRIPTION OF THE INVENTION

Figure 1:
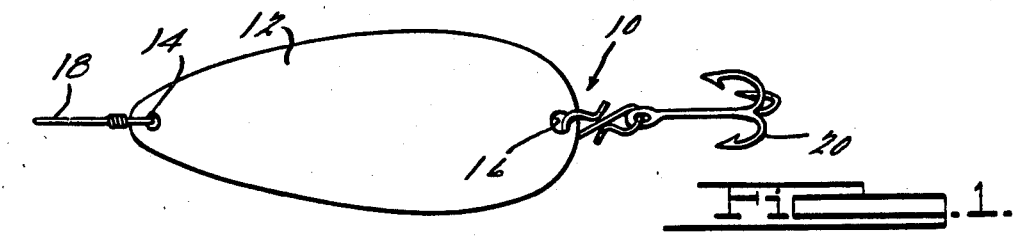
FIG. 1 shows a fishing lure hook and hook with the breakaway clip according to this invention installed therebetween, and a fishing line attached to the lure.

FIG. 1 illustrates a breakaway clip 10 according to this invention connected to a representative fishing lure 12 and hook 20. Fishing lure 12 is shown as a spoon-type lure and includes a pair of bores 14 and 16, which are used to attach the lure to fishing line 18 and breakaway clip 10, respectively. Breakaway clip 10 is also shown connected to a treble hook 20 through an eye thereof. Fishing lure 12 and treble hook 20 are exemplary only. Numerous other types of lures and hooks could be used and are within the scope of this invention.

Figure 2:
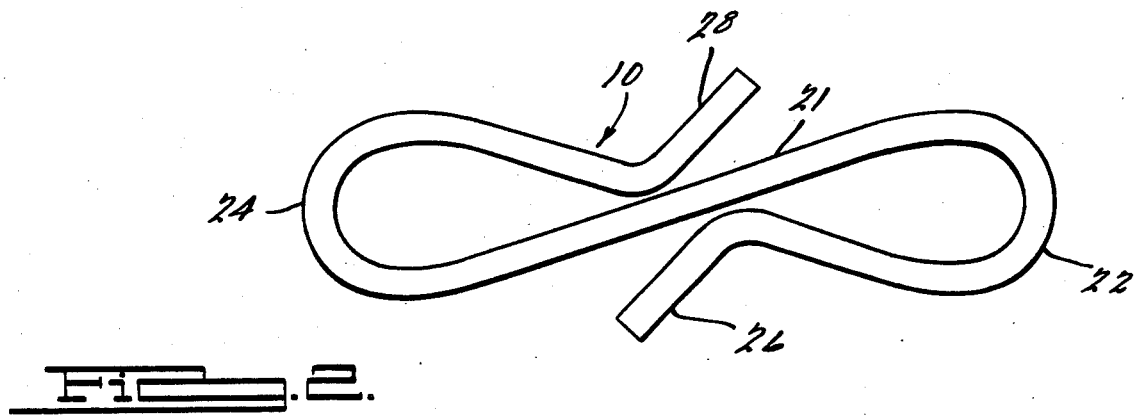
FIG. 2 is a pictorial view of a first embodiment of the breakaway clip according to this invention.

With specific reference to FIG. 2, breakaway clip 10 is shown in detail. Clip 10 is generally configured in the form of the letter "S". Clip 10 includes generally straight center section 21, first loop portion 22, and second loop portion 24. Each of the loop portions terminate at curled ends 26 and 28. It is desirable to form clip 10 so that loop portions 22 and 24 touch center section 21, or are only slightly separated therefrom. Such configuration prevents the accidental separation of hook 20 from lure 12. The material stock for clip 10 is preferably stainless steel or another non-corroding type of material. Curled ends 26 and 28 are provided to facilitate attachment of clip 10 to associated tackle components.

In use, the existing coupler between lure 12 and hook 20 is first removed. Such couplers are generally in the form of a circular wire ring and may be removed by the angler with pliers. Next, breakaway clip 10 is installed between lure 12 and hook 20 by slightly deflecting loop portions 22 and 24 as the hook and lure are slid past curled ends 24 and 26. Since loop portions 22 and 24 touch or nearly touch center section 21, the hook and lure are retained by the loop portions 22 and 24. Preferably, the loop portions provide adequate clearance for the hook and lure to retain them loosely. The installed position of breakaway clip 10 in association with lure 12 and hook 20 is shown by FIG. 1. In the event that hook 20 becomes snagged with an underwater hazard, the fisherman merely pulls on fishing line 18 until the failure load of breakaway clip 10 is reached. Failure occurs when either or both of curled ends 24 or 26 are deformed to the extent that the associated parts may be pulled free. When breakaway clip 10 fails, lure 12 can be recovered by reeling in fishing line 18. Numerous other uses for breakaway clip 10 in sport fishing are envisioned. For example, clip 10 may be employed as a releasable coupling used with so-called "downriggers" used for deep water sport fishing. In such applications, clip 10 would be used to connect the heavily weighted downrigger line to the fishing line, and would release when a tension load is exerted when a fish strikes the lure.

In using clip 10 in accordance with this invention, it is necessary to choose a failure level which is somewhat less than the failure level of the associated fishing line connected to lure 12. Fishing tackle companies place a "pound test" rating on the labels of the line that they market. A line rated "20 pound test" has a lower failure load of 20 pounds or more when tested while the line is dry. Some types of fishing line are stronger when tested wet, and others are stronger when tested dry. The American Fishing Tackle Manufacturers Association and the International Game Fish Association have developed uniform classifications for fishing lines; they are: 2-pound, 4-pound, 8-pound, 12-pound, 16-pound, 20-pound, 30-pound, 50-pound, 80-pound and 100-pound failure load. Only lines that fall into these categories are used to keep state, county, and world records. Breakaway clip 10 can be adapted for use with any of the above-mentioned fishing line test ratings. Such variations in failure load may be achieved simply by changing the diameter of the wire stock used to form clip 10. This inventor has found that pre-straightened stainless steel wire such as those marketed under the trademarks "CABELA'S" and "BERKLEY" wire work well when used to form clip 10. Such wire stock is supplied on spools and is pre-straightened. Stainless steel wire is a preferred material to form clip 10 since it does not corrode when exposed to salt or fresh water. FIG. 7 is a graphical representation of the approximate failure load of various clips made in accordance with this invention formed from stainless steel wire of various indicated diameters. As is shown, a wire diameter of 0.018 inch yields a failure load of between 6 and 7 pounds, and a wire diameter of 0.024 yields a failure level of about 14 pounds, etc.

The inventor has found that a failure load limit of approximately three to four pounds less than the failure load of the line is desirable when breakaway clip 10 is used with lines of 12, 16 and 20-pound tests. It has been found that wire of 0.011 inch is desirable for forming a clip adapted for use with 2-pound test line, and wire of 0.0135 inch is preferred for use with line having a 4-pound test rating. A somewhat larger margin between the failure load of the clip and associated line would be necessary for lines falling into the heavier pound test classes. A breakaway clip 10 that releases at about 25 pounds made from 0.037 inch wire would be preferred for line in the 30-pound test category. The above margins between the failure load of clip 10 and the rating of the line are desirable since some deviation in line breaking strength occurs due to environmental conditions, age, etc. Furthermore, knots in fishing line can reduce their breaking strength. As a means of providing ready identification of the failure load of breakaway clip 10, various colors could be used to identify clips 10 made from various wire diameters to designate a particular failure load.

Figure 3:
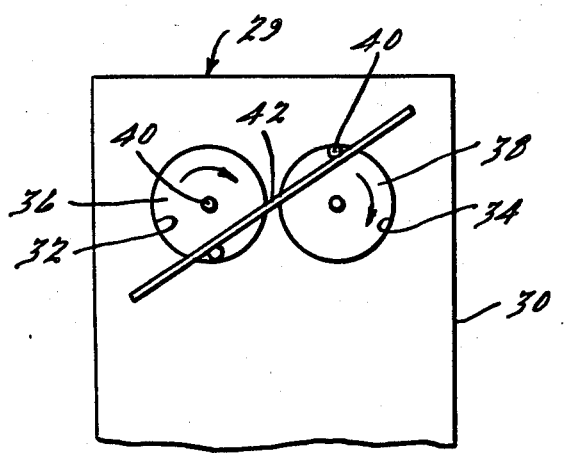
FIG. 3 shows a wire forming tool in an initial position with a length of unformed wire engaged therewith.
Figure 4:
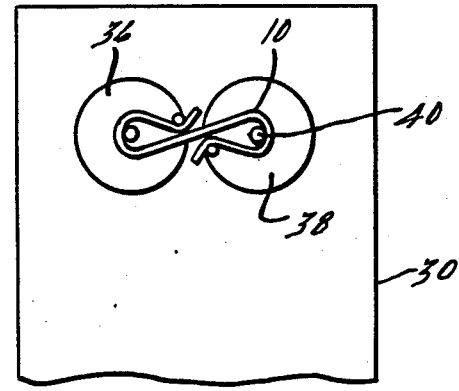
FIG. 4 shows the wire forming tool of FIG. 3 wherein the wire forming plugs are rotated such that the wire is formed into the shape of the breakaway clip shown by FIG. 2.

A tool particularly adapted to forming breakaway clip 10 is shown by FIGS. 3 and 4. Tool 29 includes body 30 having a pair of parallel bores 32 and 34 formed therein. Within bores 32 and 34 are disposed rotatable plugs 36 and 38. Protruding from each of plugs 36 and 38 is a pair of pin members 40. These pins 40 extend parallel to the central axis of bores 32 and 34. Preferably, one of pins 40 is located at the center of each of said plugs 36 and 38. FIG. 3 shows an initial rotated position for plugs 36 and 38. In this position, roll pins 40 for each of the plugs are oriented so that each pair lies along lines which are perpendicular to a line extending between the center of plugs 36 and 38. A length of straight wire stock 42 is placed between the pairs of pins 40. Next, breakaway clip 10 is formed by causing each of the plugs 36 and 38 to be rotated approximately 270 degrees to the position wherein each of the pins 40 are lying along one line as shown by FIG. 4. Any conventional means may be employed for causing rotation of plugs 36 and 38. Next, breakaway clip 10 is pulled from engagement with pins 40.

Figures 5, 6:
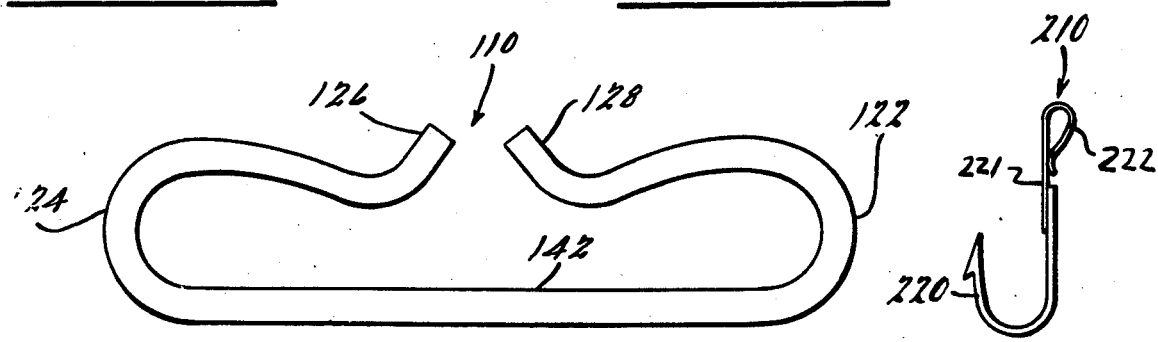
FIG. 5 is a pictorial view of a second embodiment of the breakaway clip according to this invention.
FIG. 6 is a pictorial view of a third embodiment of this invention wherein a breakaway clip is bonded directly to a modified fishing hook.

FIG. 5 illustrates a second embodiment according to this invention. Clip 110 is identical to clip 10 except that each of the loop portions 122 and 124 are formed on the same side of center straight section 121. This embodiment also preferably includes curled ends 126 and 128 which aid in installation of the clip. This embodiment could also be produced by using tool 29. The process for forming clip 110 would proceed as described above except that plugs 36 and 38 would be rotated in opposite directions.

FIG. 6 illustrates a third embodiment according to this invention. Modified fishing clip 210 is identical to that described by FIG. 2 and identified by the reference character 10, except that only one loop 222 is attached to straight section 221. For this application, straight section 221 is bonded or otherwise attached directly to the shank portion of fishing hook 220. Hook 220 is a conventional fishing hook except that the eye, which is normally used to attach a fishing line or leader, is removed. This embodiment provides a convenient and cost efficient means of incorporating the hook and fishing clip component according to this invention into one assembly. In operation, fishing clip 210 is used as previously described in that upon reaching a predetermined tension load, fishing hook 210 fails, thereby permitting the associated lure to be recovered.

While the above description constitutes the preferred embodiments of the present invention, it will be appreciated that the invention is susceptible to modification, variation and change without departing from the proper scope and fair meaning of the accompanying claims.

What is claimed is:

1. A breakaway clip connected between a fishing lure and hook, said fishing lure connected to a fishing line, said clip comprising:

a formed wire member having a substantially straight center section with first and second loop portions extending from opposite ends of said straight center section, said loop portions having a section which is positioned in close proximity to said center section, said loop portions terminating in curled ends which diverge from said center section, whereby said curled ends enable said clip to be attached to said hook and said lure by sliding said hook or lure along said center section and contacting said curled ends, thereby deflecting said loop portions and permitting said hook or lure to be retained by said loop portions, and said clip formed from wire stock of a diameter which is selected to cause said clip to fail at a predetermined repeatable release load level which is substantially less than the failure release load level of said fishing line attached to said lure such that said clip fails by plastic deformation when said predetermined load level is reached, enabling said lure to be retrieved.

2. A breakaway clip according to claim 1 wherein said clip lies entirely in one plane.

3. A breakaway clip according to claim 1 wherein said wire is formed from stainless steel.

4. A breakaway clip according to claim 1 wherein each of said loop portions lie on opposite sides of said center section.

5. A breakaway clip according to claim 1 wherein each of said loop portions lie on the same side of said center section.

6. A breakaway clip according to claim 1 wherein said clip which is formed of stainless steel wire of 0.0135 inch diameter has a failure level of approximately 3 pounds and when formed of stainless steel wire of 0.040 inch diameter has a failure level of approximately 30 pounds and wherein failure levels between said failure levels are provided by forming said clip from stainless steel wire of diameters between said diameters.

7. A breakaway clip according to claim 1 wherein when said fishing line is rated at 12 or 16 or 20 pound failure load and said predetermined load level is approximately 3 to 4 pounds less than said failure load of said line.

8. A method of preventing the loss of a fishing lure in a fishing tackle system including fishing line and a fishing hook coupled to a lure, comprising the steps of:

providing a breakaway clip having a generally straight center section, with first and second loop portions extending from opposite ends thereof, said loop portions having a section which is positioned in close proximity to said center section, said loops terminating in curled ends which diverge from said center section, said clip formed from wire stock of a diameter selected to cause said clip to fail at a predetermined load level which is substantially less than the failure level of said fishing line, attaching said clip to said lure by deflecting said first loop portion such that said lure is retained by said first loop portion, and attaching said clip to said hook by deflecting said second loop portion such that said hook is retained by said second loop portion, whereby in use, when a tension load is applied to said hook above said predetermined load level, said clip fails, thereby releasing said hook from said lure, thereby enabling said lure to be retrieved.

9. A method according to claim 8 further comprising forming said clip from stainless steel wire of 0.0135 inch diameter, thus providing a failure load level of approximately 3 pounds and forming said clip from stainless steel wire of 0.040 inch diameter having a failure level of approximately 30 pounds and wherein failure levels between said failure levels are provided by forming said clip from stainless steel wire of diameters between said diameters.

10. A breakaway clip adapted to be connected to a fishing lure and to a hook which fails at a predetermined load level which is substantially less than the failure load level of the fishing line attached to said lure such that said clip fails when said predetermined load level is reached, enabling said lure to be retrieved, said clip comprising:

a formed wire member having a substantially straight center section, with first and second loop portions extending from opposite ends of said straight center section, said loop portions having a section which is positioned in close proximity to said center section, said loop portions terminating in curled ends which diverge from said center section, whereby said curled ends enable said clip to be attached to said hook and said lure by sliding said hook or lure along said center section and contacting said curled ends, thereby deflecting said loop portions and permitting said hook or lure to be retained by said loop portions, said clip formed from wire stock of a diameter which is selected to cause said clip to fail at said predetermined load level such that when said clip is formed of stainless steel wire of 0.0135 inch diameter said clip has a failure level of approximately 3 pounds and when said clip is formed of stainless steel wire of 0.040 inch diameter said clip has a failure level of approximately 30 pounds and wherein failure levels between said failure levels are provided by forming said clip from stainless steel wire of diameters between said diameters.

* * * * *